(12) United States Patent
Finley-James et al.

(10) Patent No.: US 11,665,996 B1
(45) Date of Patent: Jun. 6, 2023

(54) STRING TRIMMER LIGHTING SYSTEM AND METHOD OF USE

(71) Applicants: Shanika Marie Finley-James, Zachary, LA (US); Damien Carl Ray James, Zachary, LA (US)

(72) Inventors: Shanika Marie Finley-James, Zachary, LA (US); Damien Carl Ray James, Zachary, LA (US)

( * ) Notice: Subject to any disclaimer, the term of this patent is extended or adjusted under 35 U.S.C. 154(b) by 0 days.

(21) Appl. No.: 17/480,875

(22) Filed: Sep. 21, 2021

(51) Int. Cl.
| | |
|---|---|
| *A01D 31/00* | (2006.01) |
| *F21V 21/08* | (2006.01) |
| *F21V 23/04* | (2006.01) |
| *A01D 34/00* | (2006.01) |
| *F21V 21/088* | (2006.01) |
| *A01D 34/416* | (2006.01) |

(52) U.S. Cl.
CPC ....... *A01D 34/001* (2013.01); *A01D 34/4167* (2013.01); *F21V 21/088* (2013.01); *F21V 23/04* (2013.01)

(58) Field of Classification Search
CPC .. A01D 34/001; A01D 34/4167; F21V 23/04; F21V 21/088
See application file for complete search history.

(56) References Cited

U.S. PATENT DOCUMENTS

| | | | | |
|---|---|---|---|---|
| 7,300,172 B1* | 11/2007 | Lefler | ................... | A47L 9/2836 |
| | | | | 362/191 |
| 8,240,893 B2* | 8/2012 | Lin | ......................... | F21V 21/30 |
| | | | | 362/396 |
| 8,550,516 B2* | 10/2013 | Best | .................... | F21V 33/0084 |
| | | | | 294/59 |
| 8,677,632 B2* | 3/2014 | Yamaoka | ........... | A01D 34/4166 |
| | | | | 30/276 |
| 10,107,484 B2* | 10/2018 | Moyers | ................. | F21V 21/096 |
| 10,724,733 B1* | 7/2020 | Backe | ................. | F21V 33/0076 |
| 10,837,629 B1* | 11/2020 | Rodriguez | ........... | A01D 34/001 |
| 10,907,810 B1* | 2/2021 | Moghal | ................... | F21V 21/14 |
| 2004/0125596 A1* | 7/2004 | Brooks | .................. | B23D 59/00 |
| | | | | 362/119 |
| 2006/0072308 A1* | 4/2006 | Booty, Jr. | ............... | F21V 15/01 |
| | | | | 362/190 |
| 2010/0064866 A1* | 3/2010 | Freeman | .............. | A01D 34/416 |
| | | | | 83/13 |
| 2014/0138507 A1* | 5/2014 | Hennessey | ............. | F16M 11/14 |
| | | | | 248/276.1 |
| 2016/0131345 A1* | 5/2016 | Ammer | ................... | F21L 4/027 |
| | | | | 362/183 |
| 2017/0314769 A1* | 11/2017 | Cacciabeve | .............. | B60Q 3/35 |
| 2019/0344423 A1* | 11/2019 | Doherty | ................. | B25G 1/102 |
| 2021/0039735 A1* | 2/2021 | Whiffin | ...................... | B62J 6/03 |

* cited by examiner

*Primary Examiner* — Abigail A Risic
(74) *Attorney, Agent, or Firm* — Leavitt Eldredge Law Firm

(57) ABSTRACT

A string trimmer lighting system includes a string trimmer having a motor, a handle, an elongated shaft, a debris shield, and a trimmer head; and a lighting device having a light source enclosed within a housing, an elongated member, a clamp, and one or more enclosure fasteners; wherein the housing includes a lens, a power switch, and a power source; wherein the light source emits light through the lens; wherein the elongated member removably attaches the housing to the clamp; wherein the clamp removably receives the elongated shaft; wherein the one or more enclosure fasteners removably tighten the clamp around the elongated shaft.

2 Claims, 4 Drawing Sheets

STRING TRIMMER LIGHTING SYSTEM AND METHOD OF USE

BACKGROUND

1. Field of the Invention

The present invention relates generally to string trimmer systems, and more specifically to a string trimmer system having a lighting device that provides lighting during operation of a string trimmer.

2. Description of Related Art

String trimmer systems are well known in the art and are effective means for horizontal trimming and vertical edging of lawn. For example, FIG. 1 depicts a conventional string trimmer 101 having a motor 103 and a handle 105 coupled to the proximal end of an elongated shaft 107. The string trimmer 101 also includes a debris shield 109 and a trimmer head 111 coupled to the distal end of the elongated shaft 107. During use, a user will utilize the string trimmer 101 to cut and trim grass, weeds, brush and other vegetation.

One of the problems commonly associated with conventional string trimmers is that users are generally limited to operating the string trimmer 101 in broad daylight for optimal visibility. Operation is especially difficult in broad daylight when outdoor temperatures are dangerously high. While outdoor lighting poles may be employed to provide visibility, however, outdoor lighting poles are expensive and difficult to install and maintain. Moreover, outdoor lighting poles do not always illuminate potentially dangerous objects on the vegetation, leading to potential harm of the user and/or the string trimmers during operation.

Hence, it would be advantageous to have a lighting device that is easy and less costly to install on a string trimmer, and allows the user to direct lighting directly over area of operation.

Accordingly, although great strides have been made in the area of string trimmer systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
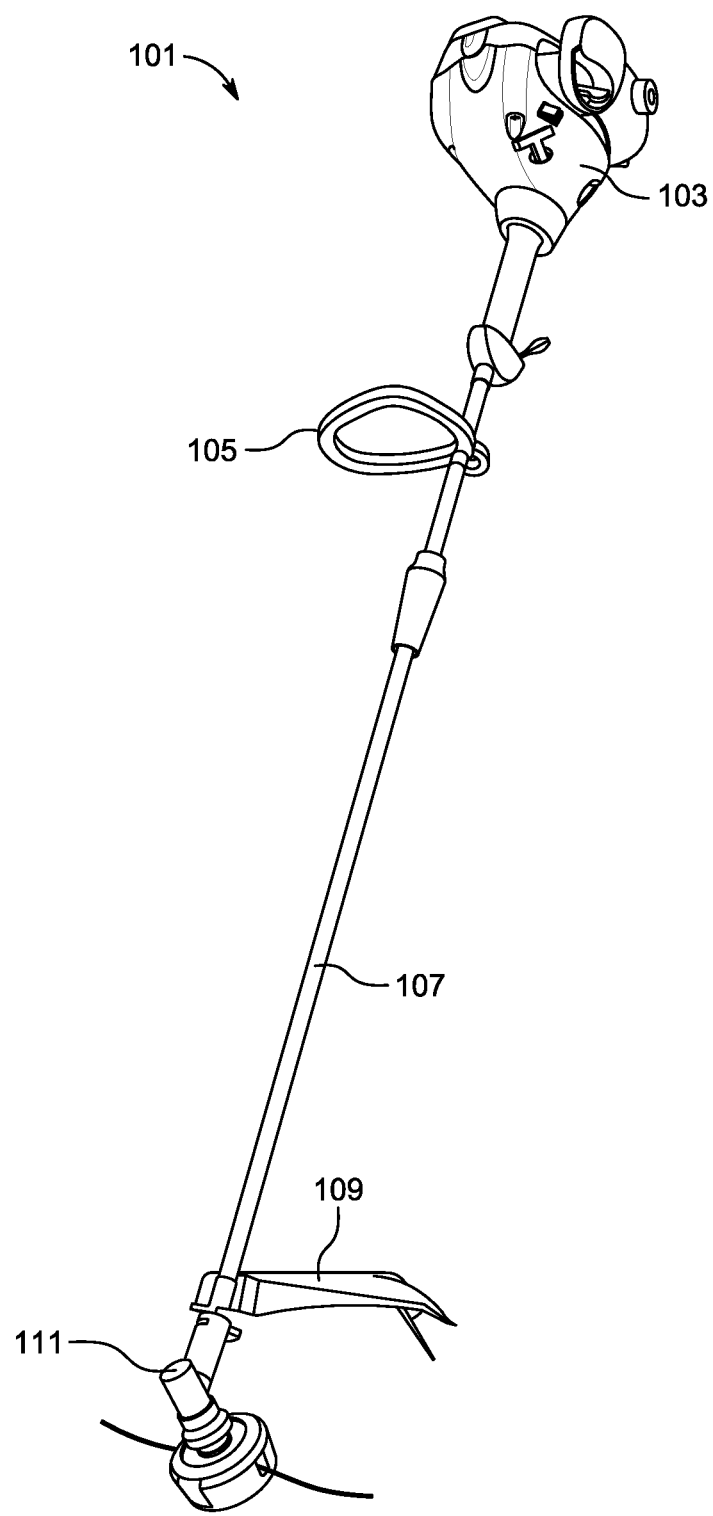
FIG. 1 is a front view of a conventional string trimmer.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional string trimmer systems. Specifically, the system of the present invention increases efficiency and safety during string trimmer operation by providing a lighting device configured to attach easily to the string trimmer. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
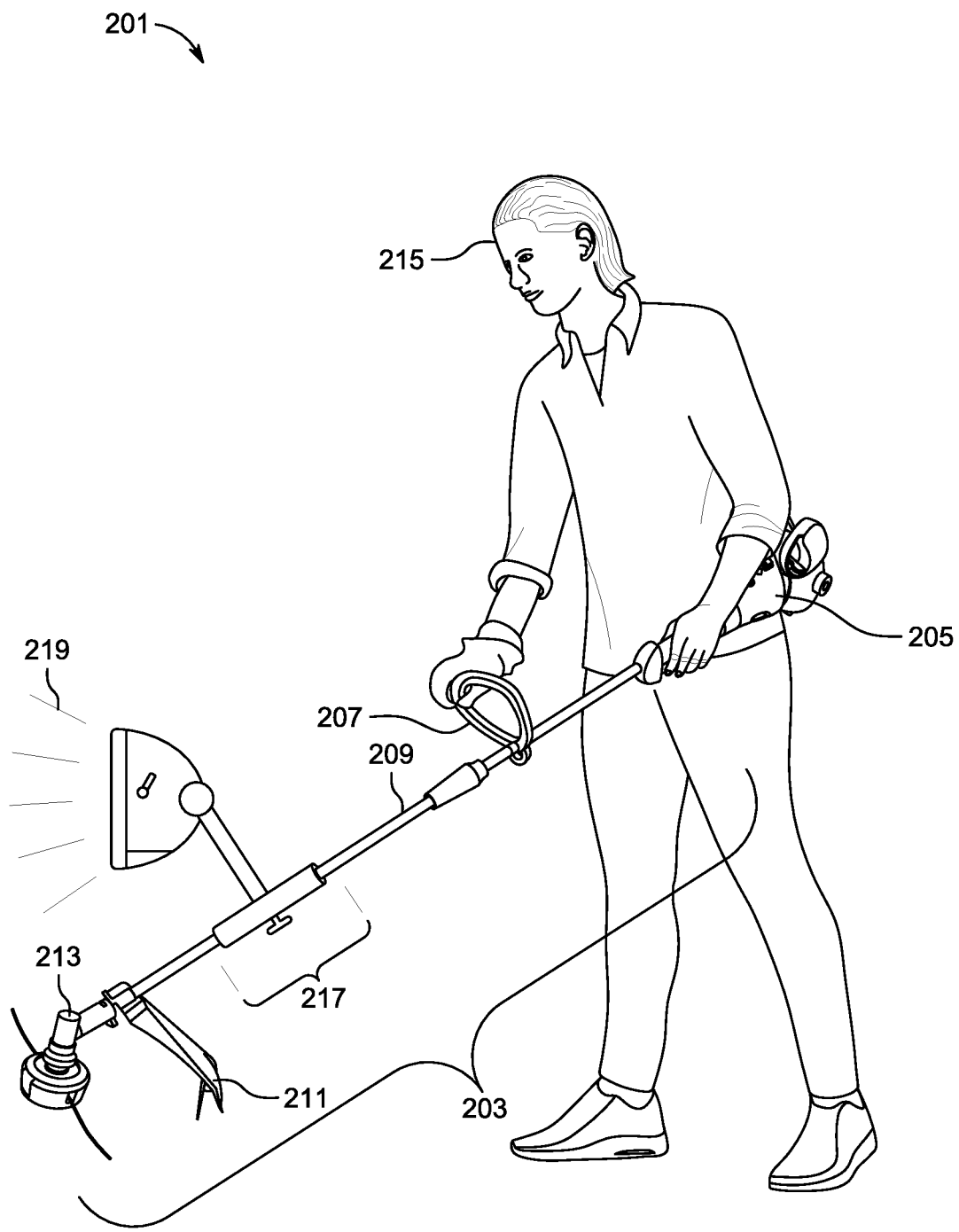
FIG. 2 is a schematic of a string trimming light system in accordance with a preferred embodiment of the present invention.

Referring now to the drawings wherein like reference characters identify corresponding or similar elements throughout the several views, FIG. 2 depicts a schematic of a string trimmer lighting system 201 in accordance with a preferred embodiment of the present application. It will be appreciated that the string trimmer lighting system 201 overcomes one or more of the above-listed problems commonly associated with conventional string trimmer systems. It should also be appreciated that the string trimmer lighting system 201 may vary based on aesthetical, functional, or manufacturing considerations.

In the contemplated embodiment, the string trimmer lighting system 201 includes a string trimmer 203 comprising of a motor 205 and a handle 207 coupled to the proximal end of an elongated shaft 209; and a debris shield 211 and a trimmer head 213 coupled to the distal end of the elongated shaft 209. It should be appreciated that the motor 205 can be a combustible fuel engine or electric motor configured to power the trimmer head 213. It should also be appreciated that the trimmer head 213 is configured to cut with a line or string spun at high speed by centrifugal force.

The string trimmer lighting system 201 also includes a lighting device 217 configured to removably couple to the elongated shaft 209. It should be appreciated that although the lighting device 217 is shown on the distal end of the elongated shaft 209, it is contemplated that the lighting device 217 could vary in location, size, style, and the like.

During use, a user 215 attaches the lighting device 217 to the elongated shaft 209. The user 215 may then activate the lighting device 217 to emit light 219 and proceed with operating the string trimmer 203. It should be appreciated that the lighting device 217 provides time flexibility for the user 215 by allowing the user 215 to operate the string trimmer 203 at any time including, without limitation, day, night, twilight, dawn, dusk, sunrise, and sunset.

It should also be appreciated that one of the unique features believed characteristic of the present application is the configuration of the lighting device that provides for increased visibility during string trimmer operation.

Figure 3:
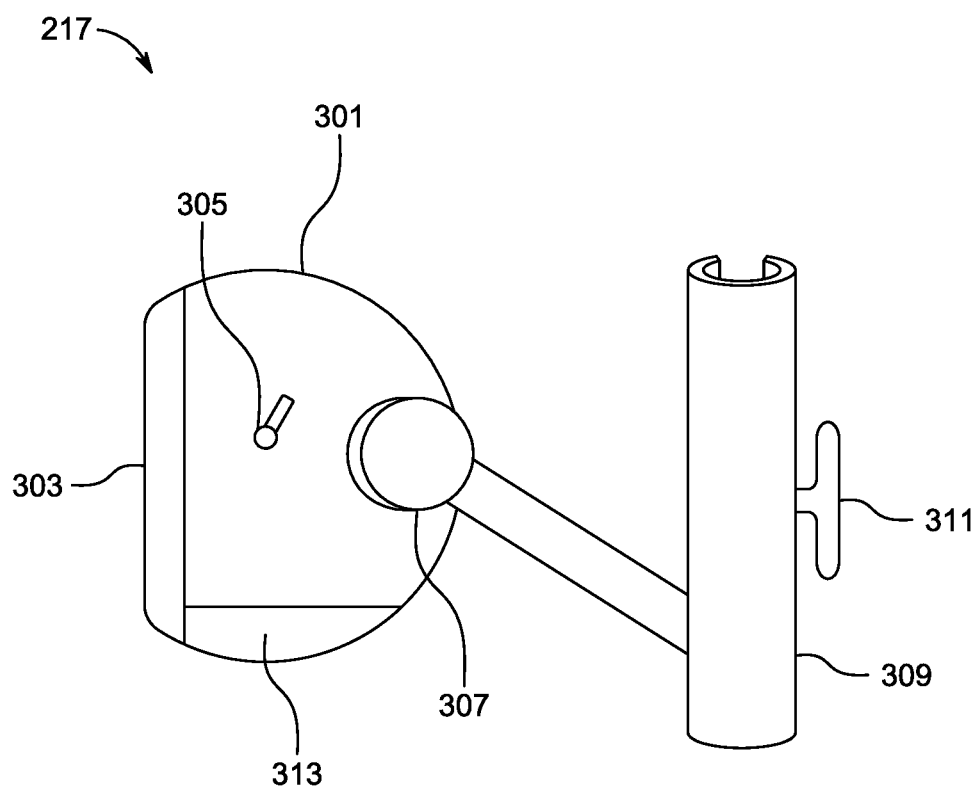
FIG. 3 is a front view of the lighting device of the system of FIG. 2 in accordance with one or more embodiments of the present application.

In FIG. 3, a profile view of the lighting device 217 is shown. As depicted, the lighting device 217 includes of a housing 301 having a light source (not shown) therein, a protective lens 303, a power switch 305, and a power source 313. The power switch 305 is configured to allow the user 215 to turn on and/or off the lighting device 217.

It should be appreciated that the light source can be any known lighting technology including, without limitation, fluorescent lighting, incandescent lighting, light-emitting diode lighting, Tungsten-halogen lighting, and high-intensity discharge lighting. In addition, it should be appreciated that the power source 313 can be any type of power storage technology including, without limitation, non-rechargeable batteries, rechargeable batteries, lead-based batteries, nickel-based batteries, and lithium-based batteries.

The lighting device 217 also includes an elongated member 307 configured to removably couple the housing 301 to a clamp 309 configured to removably receive and secure the elongated shaft 209 of a string trimmer 203 therein. The clamp 309 also includes one or more enclosure fasteners 311 configured to removably secure the clamp 309 to the elongated shaft 209.

It should be appreciated that the clamp 309 can be any type of clamp suitable to removably receive and secure the lighting device 217 to the elongated shaft 209 including, without limitation, a screw-clamp, a spring clamp, a C-clamp, a bar clamp, a strap clamp, and a web clamp. It should also be appreciated that the one or more enclosure fasteners 311 can include, without limitation, screws, pipes, bolts, and the like.

Figure 4:
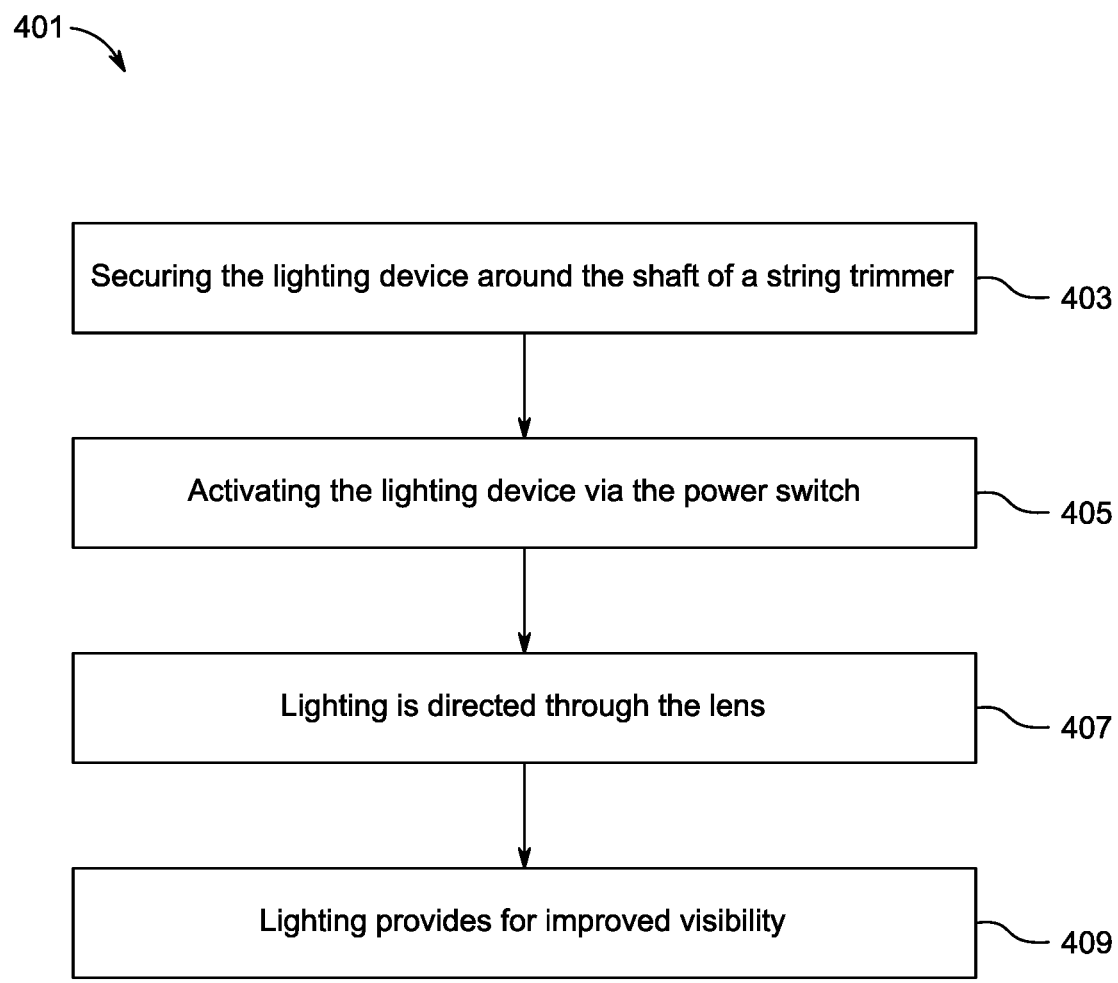
FIG. 4 is a flowchart of a method of use of the system of FIG. 2.

In FIG. 4, a flowchart 401 depicts a simplified method of use associated with the string trimmer lighting system 201. During use, the lighting device is secured around the shaft of a string trimmer, as shown with box 403. The power switch activates the lighting device upon which lighting is directed through the lens, as shown with boxes 405, 407. Lighting provides for improved visibility, as shown with box 409.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A string trimmer lighting system, comprising:
   a string trimmer, the string trimmer having:
      a motor;
      a handle;
      an elongated shaft;
      a debris shield; and
      a trimmer head;
      wherein the motor is configured to power the trimmer head; and
      wherein the trimmer head is configured to cut with a line spun by centrifugal force; and
   a lighting device, the lighting device having:
      a housing encasing a light source therein and having a protective lens;
      an elongated member extending from a first end to a second end, the first end engaged with the housing, the elongated member is adjustable and pivots relative to the housing;
      a clamp having a circular contour to match a contouring of the elongated shaft, the elongated member extending from an outer surface of the clamp at the second end of the elongated member; and
      one or more enclosure fasteners extending through a thickness of the clamp and configured to twistedly engage with the elongated shaft to tighten the clamp onto the elongated shaft;
      wherein the light source is configured to emit light through a lens; and
   wherein the elongated member removably couples the housing to the clamp;
   wherein the clamp removably receives the elongated shaft therein;
   wherein the one or more enclosure fasteners removably tighten the clamp around the shaft.

2. The system of claim 1, wherein the housing further comprises:
   a power switch configured to activate the lighting device; and
   a power source configured to supply energy to the light source.

* * * * *